W. P. ROBERTS.
DIRIGIBLE HEADLIGHT FOR AUTOMOBILES.
APPLICATION FILED MAY 17, 1917.

1,236,874.

Patented Aug. 14, 1917.
2 SHEETS—SHEET 1.

Inventor
W. P. ROBERTS
N. S. ____
By ____
Attorney

W. P. ROBERTS.
DIRIGIBLE HEADLIGHT FOR AUTOMOBILES.
APPLICATION FILED MAY 17, 1917.
1,236,874.
Patented Aug. 14, 1917.
2 SHEETS—SHEET 2.
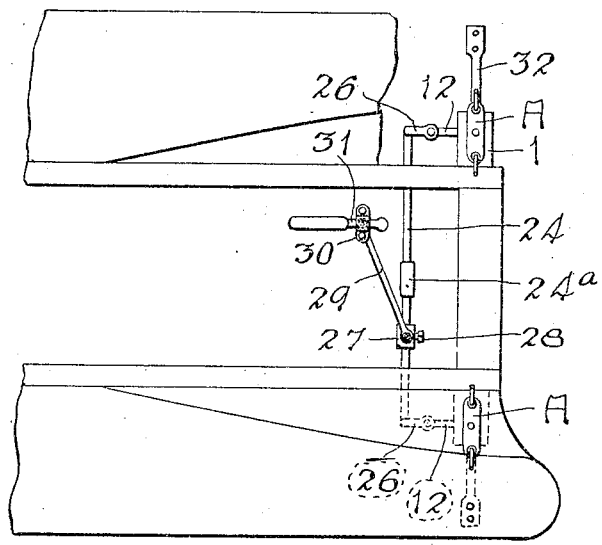
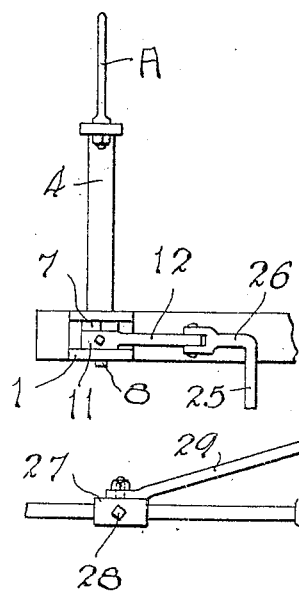
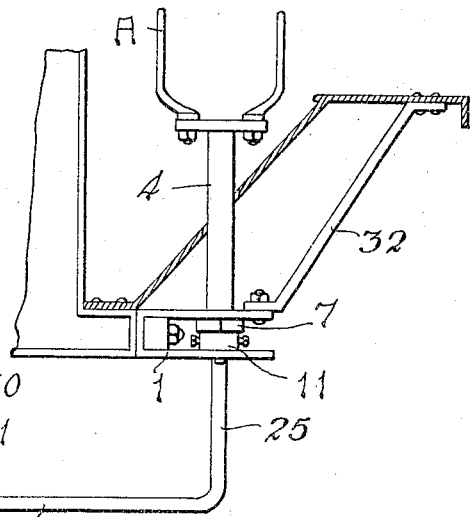
Inventor
W. P. ROBERTS
By N. S. Ireland
Attorney

UNITED STATES PATENT OFFICE.

WILLIAM P. ROBERTS, OF LAWRENCEBURG, INDIANA.

DIRIGIBLE HEADLIGHT FOR AUTOMOBILES.

1,236,874.   Specification of Letters Patent.   Patented Aug. 14, 1917.

Application filed May 17, 1917. Serial No. 169,173.

*To all whom it may concern:*

Be it known that I, WILLIAM P. ROBERTS, a citizen of the United States, residing at Lawrenceburg, in the county of Dearborn, State of Indiana, have invented a new and useful Dirigible Headlight for Automobiles; and I do hereby declare the following to be a full, clear, and exact description of the invention, such as will enable others skilled in the art to which it appertains to make and use the same.

The present invention relates to a dirigible headlight construction for motor vehicles, and has for its object to provide a device of this character which embodies novel features of construction whereby the headlights will be automatically turned with the front wheels of the vehicle, thereby causing the light to be projected in the direction in which the vehicle is turning and enabling sharp turns to be made after dark with safety.

Further objects of the invention are to provide a dirigible headlight construction which is comparatively simple and inexpensive, which can be readily applied to practically any standard make of motor vehicle and connected without difficulty to the steering mechanism thereof, and which is thoroughly dependable in its operation.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Fig. 5 is a view similar to Fig. 1, showing a modified construction of the invention.

Fig. 6 is an enlarged side elevation of one of the lamp bracket supports.

Fig. 7 is a front elevation thereof.

Corresponding and like parts are referred to in the following description and indicated in all the views of the drawings by the same reference characters.

Figure 1:
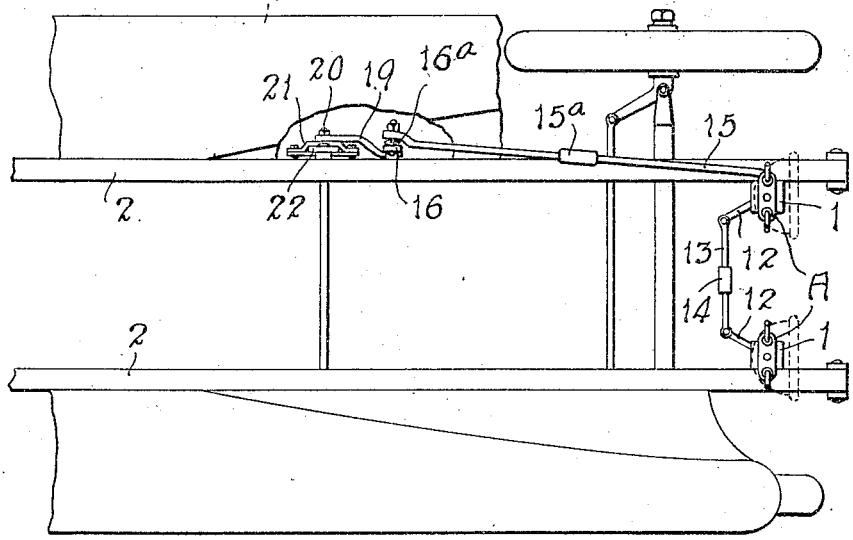
Figure 1 is a fragmentary top plan view of an automobile chassis showing a dirigible headlight constructed in accordance with the invention applied thereto.
Figure 2:
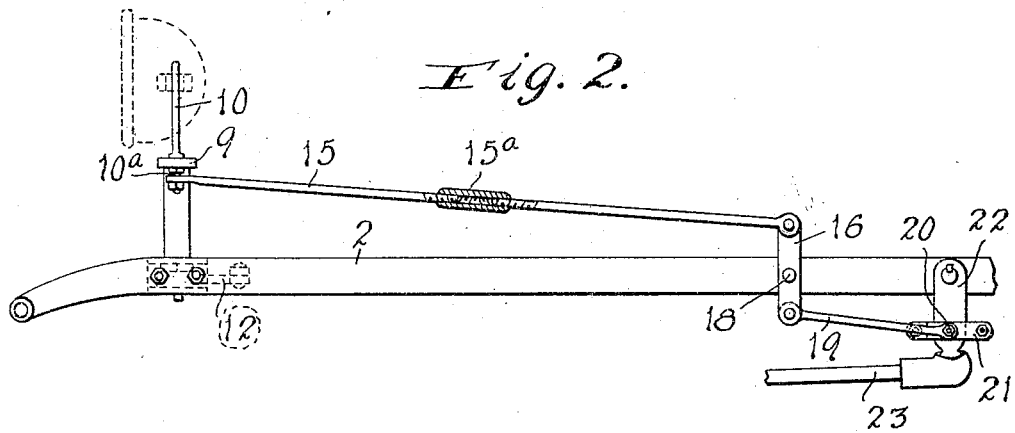
Fig. 2 is an enlarged side elevation of the headlight attachment.
Figure 4:
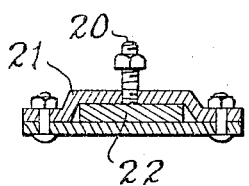
Fig. 4 is a horizontal sectional view through the steering arm of the vehicle showing the manner of applying the pivot clamp thereto.
Figure 3:
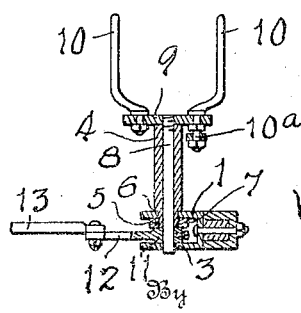
Fig. 3 is a vertical sectional view through one of the lamp bracket supports.

Referring to the drawings, which illustrate one embodiment of the invention, the numerals 1 designate a pair of channel shaped brackets which are designed to have the backs thereof secured to the projecting ends of the side bars 2 of the vehicle frame, the arms of the brackets projecting horizontally inward in a spaced and parallel relation to each other and being provided with the corresponding openings 3. A vertically disposed tubular bearing sleeve 4 projects upwardly from each of the brackets 1, the lower end of the sleeve being threaded at 5 and provided at the base of the said threaded portion with a shoulder 6. This threaded end 5 of the tubular bearing sleeve is inserted through the opening 3 in the upper arm of the respective bracket 1 and engaged by a clamping nut 7 which coöperates with the shoulder 6 to grip the edges of the opening 3 and provide a rigid connection between the bracket 1 and the bearing sleeve 4.

A vertical shaft 8 extends through each of the bearing sleeves 4 and is journaled therein, the lower end of the vertical shaft projecting downwardly through the opening 3 in the lower arm of the channel shaped bracket 1, while the upper end thereof is provided with a forked lamp supporting bracket A. These brackets are shown as including plates 9 which are rigidly secured to the upper ends of the vertical shafts 8, said plates being formed with openings which receive the inwardly offset lower ends of side bars 10. The lower end of one of the side bars is extended downwardly below the plate 9 to provide a pivot arm 10$^a$ which is utilized in establishing an operative connection between the lamp and the steering mechanism of the vehicle. The headlights B are designed to be supported upon the brackets 8 in the usual manner.

Applied to the lower end of each of the vertical shafts 8 between the clamping nut 7 of the sleeve 4 and the lower arm of the channel shaped bracket 1 is a set collar 11, said set collars being formed with lateral arms 12 which are connected by a rod 13 so that both of the lamps will be moved in unison. This rod 13 is preferably formed in two sections which are connected by a turn buckle 14 so that the effective length of the rod can be increased or decreased, thereby enabling the device to be adjusted for different sizes and makes of vehicles.

The pivot arm 10ª of one of the lamp brackets 8 is connected by a rearwardly extending link 15 to the upper end of an upright lever 16 which is arranged between the side bar 2 of the vehicle frame and the inner edge of the mud guard 17, being pivotally connected at an intermediate point in its length to the said side bar 2, as indicated at 18. The upper end of the lever 16 thus extends above the mud guard and is pivotally connected to the forwardly extending link 15, while the lower end of the upright lever extends below the mud guard and is pivotally connected to a rearwardly extending link 19 which engages a pivot pin 20 projecting from a clamp 21 which is secured to the steering lever arm 22 of the vehicle, the lower end of the steering lever arm engaging the drag link 23 and being thus operatively connected in the usual manner to the front wheels of the vehicle for the purpose of turning the same when it is desired to steer the vehicle either to the right or to the left. Spring washers 16ª are interposed between the members 15 and 19 and serve to take up looseness. The upper link 15 is preferably formed in two sections which are connected by a turn-buckle 15ª so that the effective length of the link can be increased or decreased, as desired, or as may be necessary when mounting the headlights upon any particular make of vehicle. With this construction it will be obvious that both of the headlights will be turned in unison, and that they are operatively connected to the steering lever arm 22 so as to be turned simultaneously with the front wheels of the vehicle, and in the same direction as the said front wheels, thereby causing the light to be projected in the direction in which the vehicle is turning, so that sharp turns can be made with safety.

A slight modification is shown by Figs. 5, 6 and 7, which illustrate a construction for operatively connecting the head lamps to the steering gear of a vehicle which does not include a drag link and steering lever arm, as in the previous instance. With a vehicle of this type a horizontal rod 24 is arranged under the vehicle body and just to the rear of the front spring, the ends of the bar being extended upwardly at 25 and then forwardly at 26 to provide arms which are pivotally connected to the before mentioned crank arms 12 of the lamp carrying shafts 8. The rod 24 is formed of sections which are connected by a turn-buckle 24ª so that the effective length of the rod can be adjusted as desired. A sleeve 27 is also rigidly secured in proper position upon the rod 24 by means of a set screw 28, said sleeve being pivotally connected by a link 29 to a clamp 30 which is applied to the steering arm 31 of the vehicle. The brackets 1 are shown as applied to the side of the main frame at the front thereof, and as having the fender supporting arms 32 secured to the outer ends thereof. The manner of mounting the lamps themselves, is exactly as previously described, and it is obvious that the lamps will be turned when the vehicle is steered, thereby causing the lights to be projected in the direction in which the vehicle is turning.

Having thus described the invention, what I claim as new and desire to secure by Letters Patent, is:—

1. A dirigible headlight construction for motor vehicles, including a channel shaped bracket adapted to have the back thereof secured to the vehicle frame with the arms thereof horizontally disposed, a vertical tubular bearing projecting upwardly from the bracket and extending through the upper arm thereof, a clamping nut fitted upon the tubular bearing for engagement with the bracket, a vertical shaft journaled within the tubular bearing and projecting through the lower end thereof, a set collar applied to the said projecting end of the shaft, a lamp bracket applied to the upper end of the vertical shaft, and an operative connection between the vertical shaft and the steering gear of the vehicle.

2. A dirigible headlight construction for motor vehicles, including a bracket adapted to be applied to the side of a vehicle frame and formed with spaced upper and lower horizontal arms, a vertically disposed tubular bearing sleeve projecting upwardly from the bracket, means for rigidly securing the lower end of the bearing sleeve to the upper arm of the bracket, a shaft extending through and journaled within the bearing sleeve and projecting downwardly below the same, a set collar applied to the projecting lower end of the shaft and confined between the spaced arms of the bracket, a lamp bracket applied to the upper end of the vertical shaft, and an operative connection between the vertical shaft and the steering gear of the vehicle.

3. A dirigible headlight construction for motor vehicles, including a bracket adapted to be applied to the vehicle frame and formed with spaced upper and lower horizontal arms having corresponding openings therein, an upright tubular bearing sleeve projecting from the bracket and having the lower end thereof threaded and fitted within the opening of the upper bracket arm, a clamping nut applied to the threaded lower end of the bearing sleeve for holding it rigidly in position, a shaft extending through the bearing sleeve and journaled therein, the lower end of the shaft projecting below the sleeve and extending through the opening in the lower arm of the bracket, a set collar applied to the shaft between the upper and lower arms of the bracket and confined between the said arms, a lamp bracket carried by the upper end of the shaft, and an operative connection between the shaft and the steering mechanism of the vehicle.

4. A dirigible headlight construction for motor vehicles, including a channel shaped bracket adapted to have the back thereof secured to the side of the vehicle frame with the arms thereof projecting horizontally in a superposed relation, an upright tubular bearing sleeve projecting upwardly from the bracket and having the lower end thereof rigidly secured to the upper arm of the bracket, a vertical shaft extending through and journaled within the bearing sleeve, the lower end of the shaft projecting below the bearing sleeve, a set collar applied to the projecting lower end of the shaft and confined between the arms of the channel shaped bracket, a lamp bracket applied to the upper end of the vertical shaft, and an operative connection between the shaft and the steering gear of the vehicle.

In testimony whereof I have signed my name to this specification in the presence of two subscribing witnesses.

WILLIAM P. ROBERTS.

Witnesses:
 OLIVER N. WEIS,
 ROY J. WEIS.

Copies of this patent may be obtained for five cents each, by addressing the "Commissioner of Patents, Washington, D. C."